United States Patent

[11] 3,614,631

[72] Inventors William E. Be Vier
Schenectady;
Rolf E. Wagner, Latham, both of N.Y.

[21] Appl. No. 878,793
[22] Filed Nov. 21, 1969
[45] Patented Oct. 19, 1971

[73] Assignee Mechanical Technology Incorporated
Latham, N.Y.

[54] PULSE COUNTER HAVING SELECTABLE WHOLE AND FRACTIONAL NUMBER DIVISION
13 Claims, 5 Drawing Figs.

[52] U.S. Cl. .......... 328/48, 328/99, 328/165, 340/146.1
[51] Int. Cl. .......... H03k 21/30
[50] Field of Search .......... 328/99, 48, 165; 340/146.1

[56] References Cited

UNITED STATES PATENTS

| | | | |
|---|---|---|---|
| 2,840,708 | 6/1958 | Sandiford | 328/48 |
| 3,096,483 | 7/1963 | Ransom | 328/48 |
| 3,263,174 | 7/1966 | Bjorkman et al. | 328/48 X |
| 3,286,191 | 11/1966 | Cornwell | 328/48 X |
| 3,375,449 | 3/1968 | Ribour et al. | 328/48 |
| 3,393,366 | 7/1968 | Shoop | 328/48 |

*Primary Examiner*—John S. Heyman
*Attorneys*—Joseph Claeys and Charles W. Helzer

ABSTRACT: A system for correcting errors in pulse data signals generated by a repetitive source wherein the data signals are fed to a blocking circuit where they pass on to the output means of the system as long as a blocking signal is not present at the blocking circuit. The pulses which pass through the blocking circuit are divided into a selected discrete number of pulses included in the calibration factor. For each discrete number of pulses of the pulse source, the divider delivers one pulse to the system output means and also one pulse to a feedback path which includes a binary correction circuit which is precoded to deliver a blocking signal to the blocking circuit when certain stages of the binary correction circuit are at the "1" level. The states which are operative to cause such a blocking signal to be sent to the blocking circuit are in direct relation to the arrangement of bits of the binary equivalent of the fractional part of the calibration factor so that there appears a precisely calibrated output from the system.

Inventors
William E. BeVier
Rolf E. Wagner
by Joseph V. Claeys
Their Attorney

Inventors
William E. BeVier
Rolf E. Wagner
by Joseph V. Claeys
Their Attorney

Fig. 5.

$78_{10} = 110001_2$

| 6 | 5 | 4 | 3 | 2 | 1 | i | TOTAL SENSOR PULSES | CUM. OMITS | OMITS | N | |
|---|---|---|---|---|---|---|---|---|---|---|---|
| 1 | 0 | 0 | 0 | 1 | 1 | $c_i$ / $N_y$ | | | | DEC | BINARY |
| | | | | | ① | 4.78 | 5 | 1 | 1 | 1 | 000001 |
| | | | | ① | | 9.56 | 10 | 2 | 1 | 2 | 000010 |
| | | | | | ① | 14.34 | 15 | 3 | 1 | 3 | 000011 |
| | | | 1 | | | 19.12 | 19 | 3 | | 4 | 000100 |
| | | | | | ① | 23.90 | 24 | 4 | 1 | 5 | 000101 |
| | | | | ① | | 28.68 | 29 | 5 | 1 | 6 | 000110 |
| | | | | | ① | 33.46 | 34 | 6 | 1 | 7 | 000111 |
| | | 1 | | | | 38.24 | 38 | 6 | | 8 | 001001 |
| | | | | | ① | 43.02 | 43 | 7 | 1 | 9 | 001001 |
| | | | | ① | | 47.80 | 48 | 8 | 1 | 10 | 001010 |
| | | | | | ① | 52.68 | 53 | 9 | 1 | 11 | 001011 |
| | | | 1 | | | 57.36 | 57 | 9 | | 12 | 001100 |
| | | | | | ① | 62.14 | 62 | 10 | 1 | 13 | 001101 |
| | | | | ① | | 66.92 | 67 | 11 | 1 | 14 | 001110 |
| | | | | | ① | 71.70 | 72 | 12 | 1 | 15 | 001111 |
| | 1 | | | | | 76.48 | 76 | 13 | | 16 | 010000 |
| | | | | | ① | 81.26 | 81 | 13 | 1 | 17 | 010001 |
| | | | | ① | | 86.04 | 86 | 14 | 1 | 18 | 010010 |
| | | | | | ① | 90.82 | 91 | 15 | 1 | 19 | 010011 |
| | | | 1 | | | 95.60 | 95 | 15 | | 20 | 010100 |
| | | | | | ① | 100.38 | 100 | 16 | 1 | 21 | 010101 |
| | | | | ① | | 105.16 | 103 | 17 | 1 | 22 | 010110 |
| | | | | | ① | 109.94 | 110 | 18 | 1 | 23 | 010111 |
| | | 1 | | | | 114.72 | 114 | 18 | | 24 | 011000 |
| | | | | | ① | 119.50 | 119 | 19 | 1 | 25 | 011001 |
| | | | | ① | | 124.28 | 124 | 20 | 1 | 26 | 011010 |
| | | | | | ① | 129.06 | 129 | 21 | 1 | 27 | 011011 |
| | | | 1 | | | 133.84 | 133 | 21 | | 28 | 011100 |
| | | | | | ① | 138.62 | 138 | 22 | 1 | 29 | 011101 |
| | | | | ① | | 143.40 | 143 | 23 | 1 | 30 | 011110 |
| | | | | | ① | 146.18 | 148 | 24 | 1 | 31 | 011111 |
| ① | | | | | | 152.96 | 153 | 25 | 1 | 32 | 100000 |
| | | | | | ① | 157.74 | 158 | 26 | 1 | 33 | 100001 |
| | | | | ① | | 162.52 | 163 | 27 | 1 | 34 | 100010 |
| | | | | | ① | 167.30 | 168 | 28 | 1 | 35 | 100011 |
| | | | 1 | | | 172.08 | 172 | 28 | | 36 | 100100 |

Inventors
William E. BeVier
Rolf E Wagner
by Joseph V. Claeys
Their Attorney

PULSE COUNTER HAVING SELECTABLE WHOLE AND FRACTIONAL NUMBER DIVISION

This invention relates to a new and improved pulse train modification system and more particularly to such a system for achieving a desired discrete relationship between pulses from a repetitive source and a given reference unit. Although this invention has a wide range of applications, it is especially advantageous for dividing the pulse repetition rate by an irrational number factor, that is, by a factor which comprises a whole number portion and a fractional portion, and will be particularly described in that connection.

As will become evident later, the invention may be incorporated in a variety of different hardware systems such as mechanical, electrical, fluidic and the like. Because there are many applications where a system must operate in a hazardous environment so that the use of a fluidic system would be very desirable, reference may be made from time to time to the use of the invention with such fluidic systems. For example, whereas in a given application certain prior art electronic digital measuring systems may be able to achieve satisfactory results, such systems would not be functional if changed to a fluidic system because of the problems associated with the relatively slow signal transmission compared to electronics.

Various arrangements are known in the prior art for dividing the pulse repetition rate and, while such existing arrangements are usually complex and expensive, they are generally satisfactory for division by a whole number factor. Such prior art systems and arrangements are, for the most part, wholly unsatisfactory when division is required by an irrational number factor.

One specific field of application requiring division by an irrational number is in the measuring of an analog signal with digital apparatus. For example, in measuring flow the pulses may be generated by a suitable digital sensor which is operatively associated with a positive displacement or turbine-type flowmeter and generates a number of pulses per a selected reference unit, such as for example gallons, pounds or the like.

As is well known, digital techniques are particularly attractive for the measurement of discrete units since digital sensors are simple to make, reliable to use and are not subject to problems of linearity and attenuation. Also, digital control circuits are not subject to zero drift and are capable of higher speeds than analog circuits. Although less ideally suited for the measurement of analog signals, the advantages of accuracy, simplicity, and reliability are sufficiently great to cause digital techniques to be widely used for such measurement.

Digital sensors are inherently inaccurate when errors due to nondiscrete calibration of pulses per unit are allowed to accumulate. Prior art attempts to prevent such accumulation have included:

1. Designing the digital sensor so that mechanical adjustment to a discrete number of pulses per unit can be accomplished,
2. Making the number of pulses generated by the sensor so large that the error per unit is extremely small, or
3. Converting the digital output signal from the sensor to an analog signal, adjusting the analog level, and reconverting to a digital signal.

The first approach is inherently inaccurate and the required adjustment is difficult. The second approach is available only to systems having high response speeds, such as in electronic systems where high pulse rates are possible, while the third approach introduces the objectional aspects of the analog measuring systems, such as drift, nonlinearity, and the like.

It is a primary object of this invention, therefore, to provide a new and improved system for digitally measuring analog signals and which system overcomes one or more of the foregoing prior art difficulties.

It is another object of this invention to provide a new system for dividing pulse signals from a repetitive source, such as a digital sensor, by a calibration factor comprising a whole number portion and a fractional portion.

It is further object of this invention to provide a new system for modifying the train of pulses from a negative source in a manner to provide a discrete relationship between such pulses and a selected reference unit.

It is yet another object of this invention to provide a novel pulse train modification system which is simple, inexpensive and has an accuracy limited only by accuracy and repeatability of the pulse producing source.

It is a further object of this invention to provide a new system for modifying a train of pulses from a repetitive source by a calibration factor comprising a whole number portion and a fractional portion and wherein any changes in the calibration factor due to changes in the output of the pulse source may be made automatically in response to signals related to a change in some parameter associated with the pulse source.

A still further object of the invention is to provide a new system for modifying a train of pulses from a repetitive source by a desired calibration factor and which system is simple, inexpensive and accurate and wherein a change to a different calibration factor may be accomplished easily.

Briefly stated, in accordance with one aspect of the invention, a pulse train is modified by blocking some of the pulses of the pulse train under the control of feedback pulse signals, which feedback pulse signals are directly related to the arrangement of bits of the binary equivalent of the fractional portion of a calibration factor required to produce a desired precisely calibrated output.

The novel features believed characteristic of the invention are set forth with particularity in the appended claims. The invention itself both as to its organization and method of operation as well as further objects and advantages thereof, may best be understood by reference to the following description taken in conjunction with the following drawing in which:

FIG. 5 shows a table illustrating the principle of the correction system.

Figure 1:
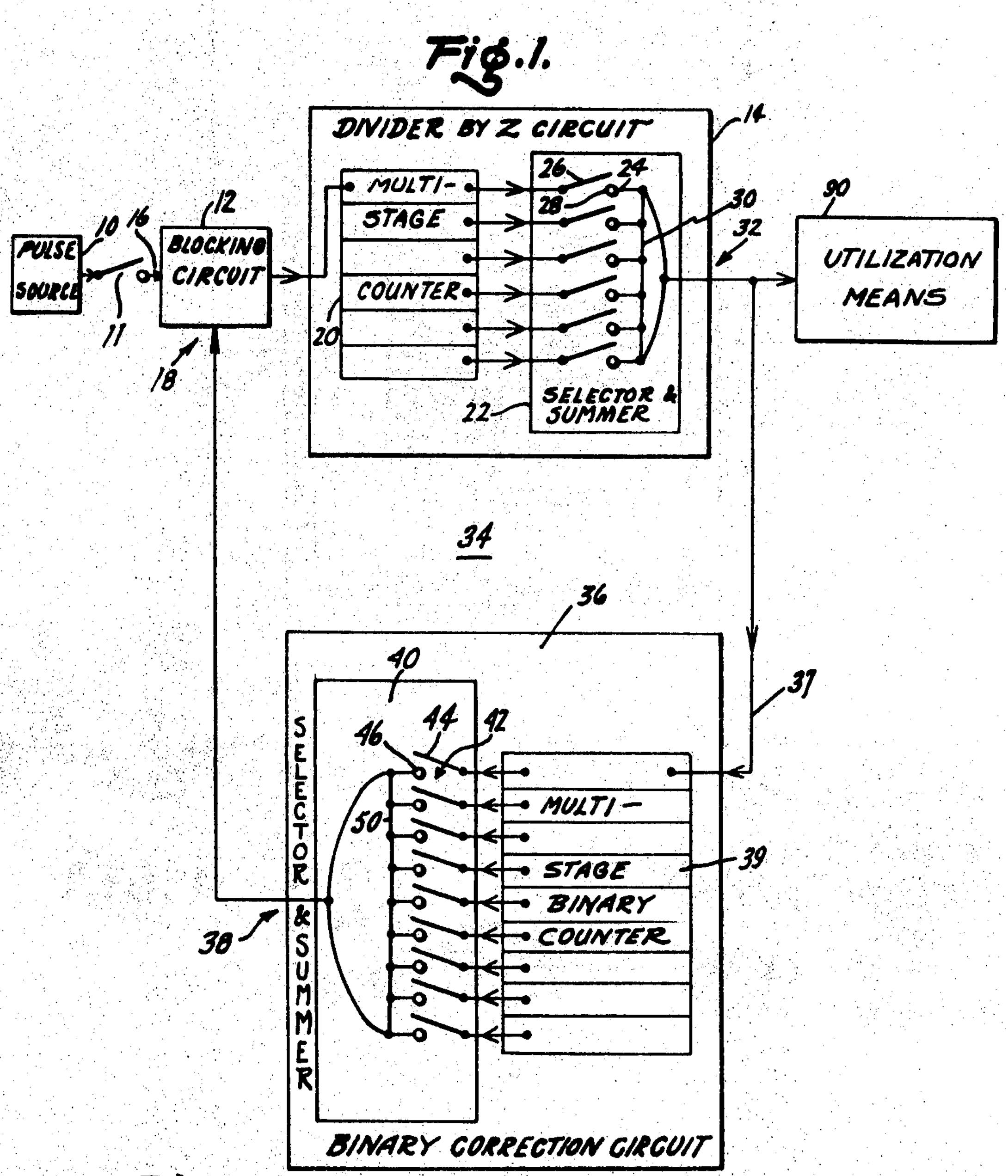
FIG. 1 is a block diagram of one form of pulse train modification system in accordance with an embodiment of the invention.

Referring now to FIG. 1, there is shown a schematic block-type diagram in which the pulse train from a pulse source 10 is modified in accordance with this invention by elimination of pulses; the pulses eliminated being in direct relation to the arrangement of bits of the binary equivalent of the fractional portion of the calibration factor required to provide a desired precisely calibrated pulse train.

To this end, the system shown includes a pulse transmission path having positioned therein a blocking circuit means 12 and a divider circuit means 14. The blocking circuit means 12 has a normal input means, designated generally at 16, and an inhibit input means, designated generally at 18. Blocking circuit means 12 is operative to pass the pulses applied to normal input means 16 unless there is also a pulse at the inhibit input means 18 thereof. Stated another way, a pulse applied to the normal input means 16 is blocked when there is also a pulse at the inhibit input means 18.

Divider circuit means 14 may be of any suitable type which will provide for division of the pulse repetition rate by a given whole number "Z." For example, divider circuit 14 may be provided by a binary counter that resets and generates an output pulse every time it accumulates Z pulses. Accordingly, divider circuit means 14 has been identified in the drawing as a "divider by Z circuit."

Thus, if the invention is to be used in a digital measuring system where the calibration of the meter on which a suitable digital sensor is mounted is 7.78 pulses per pound, then Z is equal to seven and divider circuit means 14 produces a divider output pulse for each seven pulses received at the input means thereof.

In the particular arrangement illustrated in FIG. 1, divider circuit means 14 is shown as comprising a multistage counter 20 and a suitable selector and summing means 22. For simplicity, selector and summing means 22 is illustrated as comprising a plurality of switches 24 each having a movable arm 26 and a stationary contact 28. The output of each stage of the counter 20 is coupled with one of the movable arms 26 of a switch 24 and the stationary contacts 28 of the switches are all connected to a suitable summing means 30 and thence with the output means 32 of the divider circuit 14. From the foregoing it can be seen that by provision of a counter 20 having an adequate number of stages, appropriate actuation of switches 24 to selected open or closed positions provides any desired division. That is, any desired value of Z may be provided.

Conveniently, counter 20 may comprise a plurality of bistable stages the outputs of which may be selectively summed in selector and summing means 22 in any suitable manner. Various arrangements of such bistable stage to provide multistage counters are well known in the art, as are arrangements of resetting binary counters and combinations of counters with a suitable selection and summing means to provide divider circuits. Suitable divider circuits for use in this invention are so well known in the art that no specific circuit description thereof is deemed necessary to a complete understanding of the invention. All that is required is that the circuit produce an output pulse after a preselected number of pulses have been received at its input.

In accordance with this invention, pulses of the pulse train are eliminated in a prescribed manner to produce a desired precisely calibrated output. As shown in FIG. 1, the pulses to be eliminated are controlled by the pulse signals applied over a feedback path 34 to the inhibit input means 18 of blocking circuit means 12 and which pulse signals are in diect relation to the arrangement of bits of the binary equivalent of the fractional portion of the calibration factor.

To accomplish the foregoing elimination of pulses from the pulse train, feedback path 34 is connected between the output 32 of divider circuit 14 and the inhibit input means 18 of blocking circuit 12. The feedback path 34 comprises a binary correction circuit 36, having its input means 37 coupled with the output means 32 of divider circuit 14 and its output means 38 coupled with inhibit input means 18 of blocking circuit 12. Binary correction circuit 36 receives the divider output pulses and causes pulses to be produced at its output which are in direct relation to the arrangement of bits of the binary equivalent of the fractional portion of the calibration factor. These pulses are applied to inhibit input means 18 of blocking circuit 12 to cause pulses of the pulse train to be eliminated in direct relation thereto.

Any suitable circuit arrangement for accomplishing the foregoing production of pulses directly related to the binary equivalent of the fractional portion of the calibration factor may be employed. In the arrangement shown in FIG. 1, the binary correction circuit 36 comprises a multistage binary counter 39 and a selector and summing means 40 suitably coupled with the binary counter 39. Again, for simplicity, selector and summing means 40 is shown as including a plurality of switches 42 each having a movable arm 44 and a stationary contact 46. One switch is operatively associated with one stage of the binary counter, as shown, by having the movable arm 44 thereof connected with the output of its associated counter stage; the stationary contacts 46 of all of all the switches being connected to a suitable summing means 50 and thence with the output means 38 of binary correction circuit 36. By providing an adequate number of stages for binary counter 39 and actuating the switches to selected open or closed positions the output pulses appearing at output means 38 may be made to be in direct relation to the arrangement of bits of binary equivalent of the fractional portion of the calibration factor, as required to provide for the elimination of the appropriate pulses to provide an output at output means 32 which is precisely calibrated.

Although in FIG. 1 selector and summing means 22 and 40 have been illustrated for simplicity by a plurality of simple switches, it is to be understood that other suitable selection and summing means may be employed such as, for example, merely manually connecting the counter stage outputs in a desired suitably isolated manner or by use of a plurality of patch cords or the like. Any of such suitable selector and summing means will allow for the easy and rapid changing of the calibration factor as may be required from time to time to provide the required precisely calibrated output by the mere expedient of changing the positions of the various connections, switches, etc.

It would be very advantageous to continuously maintain the precisely calibrated output in spite of any changes in the pulse train. Such changes in the pulse train could be occasioned by a change in some parameter, such as temperature or the like, in the system being monitored or on which the measurements are being made. For example, in a flow measuring system a change in the viscosity of the fluid, a change in temperature, or a change in some other parameter may cause a change in the pulse train output of the digital sensor such that a change in the calibration factor must be made to achieve the precise calibration.

In accordance with another feature of this invention, therefore, the pulse train modification system is provided with selector and summing means 40 which include means responsive to external signals. The selector means then operates to provide for a change in the selection of the outputs of the binary counter 39 in accordance with such external signals to change the binary equivalent of the fractional portion of the calibration factor to that required to maintain the precisely calibrated output. If desired, selector and summing means 22 associated with divider circuit 14 may also include suitable means responsive to such external signals to provide for any required change in the whole number portion.

To this end, selector and summing means 40 of binary correction circuit 36 (and selector and summing means 22 when desired) may be provided with a plurality of suitable signal responsive means, such as gating or controllable switch means, which will provide the proper selection of binary counter stage outputs in accordance with external signals applied to an appropriate input thereof.

Figure 2:
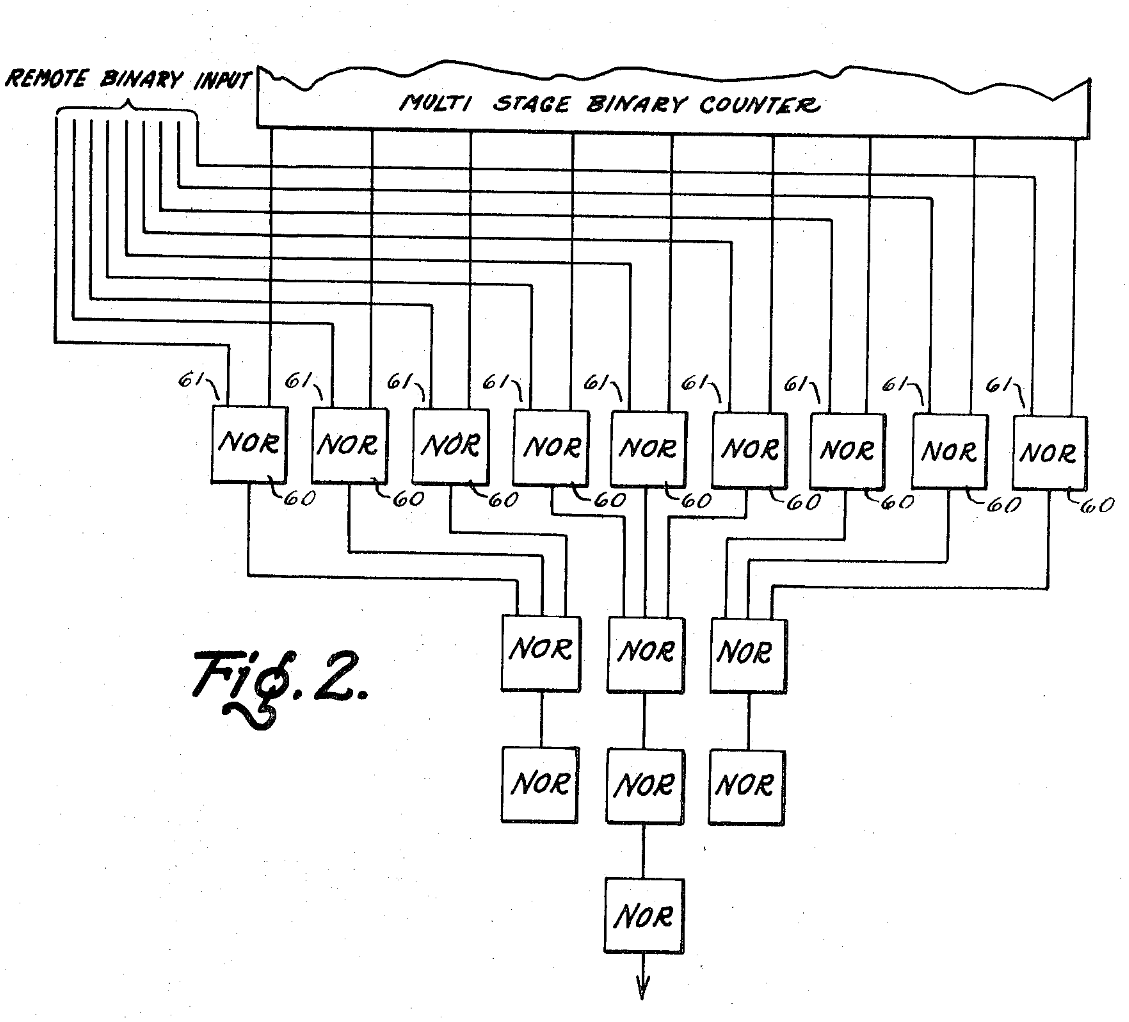
FIG. 2 shows a schematic block-type diagram of a selector and summing means including gating means responsive to external signals to provide for changing the fractional portion of the calibration factor in accordance with a change in such external signals.
Figure 3:
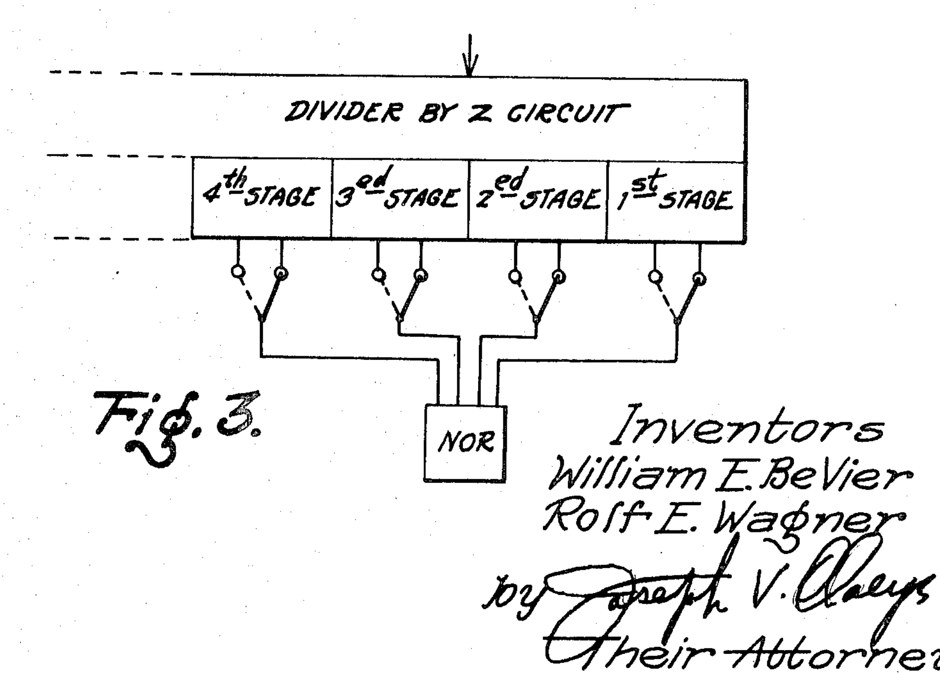
FIG. 3 shows a schematic block-type diagram of a selector and summing means including gating means responsive to external signals to provide for changing the whole number portion of the calibration factor in accordance with a change in such external signals; and, FIG. 4 is a schematic diagram of the type of pulse source the output of which requires calibration.

One suitable selector and summing means for achieving the desired continuous selection of outputs of binary counter 39 is illustrated in FIG. 2. As shown, the selector and summing means 40 comprises a plurality of gates 60 each of which has an external signal applied at an input 61 thereof so that such gate will be in an open or closed condition depending upon whether or not there is an external signal present; a change in such external signals thereby operating to change the condition of various gates, and thus the selection of counter stage outputs, which in turn sets up a new arrangement of outputs to correspond to the required new binary equivalent of the fractional portion of the calibration factor. As shown the selector and summing means illustrated in FIG. 2 is made up of a plurality of NOR circuits although any other suitable logic circuits may be employed as is well known.

In operation, pulses from pulse source 10 are applied through switch means 11 to the normal input means 16 of the blocking circuit means 12 and, if no pulse is present at the inhibit input means 18, are passed to the input of divider circuit 14 where they are divided by the whole number portion Z of the calibration factor. The fractional portion of the calibration factor is treated separately by the feedback path 34.

Figure 4:
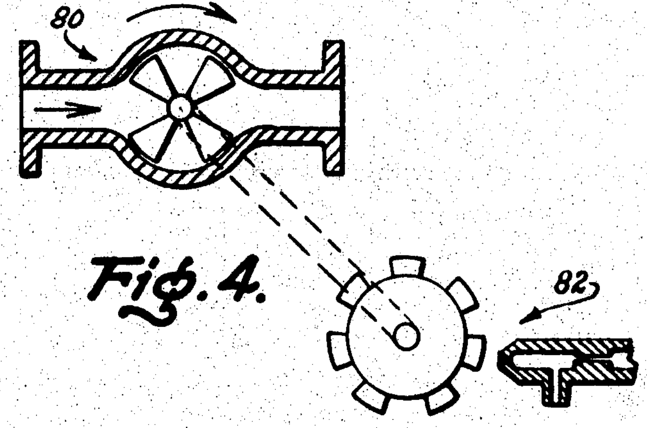

To simplify the explanation of the invention assume, by way of example only, that pulse source 10 comprises a flowmeter 80 on which a suitable digital fluidic sensor 82 is mounted as shown schematically in FIG. 4. Assume also, that the calibration factor of the flowmeter 80 to provide for a precise calibrated output in pulses per pound has been determined to be 7.78. Accordingly, the calibration factor can be expressed as:

$Y=Z+W$ where $Y=$ the calibation factor $Z=$ the whole number portion of $Y$ $W=$ the fractional portion of $Y$.

In the foregoing example, therefore, the whole number portion of the calibration factor is seven and the fractional portion is 0.78 so that divider circuit 14 would be arranged to produce a divider output pulse every time seven pulses have been accumulated.

The divider output pulse appearing at output means 32 is applied to the feedback path 34 and drives the multistage binary counter 39 of the binary correction circuit 36. In order to properly select the counter stage outputs to cause pulses to be applied in the desired manner to the inhibit input means 18 of the blocking circuit means 12, the binary number equivalent of the decimal fraction portion of the calibration (0.78) must be determined. Such mathematical conversion from decimal to binary form is well known and need not be described herein. For purposes of the specific example the fractional portion, 0.78, when expressed as a binary number is:

$W=0.110001_2$

In accordance with this invention the binary correction circuit 36 of feedback path 34 causes pulses to be applied to the inhibit input means 18 of the blocking circuit 12 in direct relation to the arrangement of bits of the binary number. For example, if the system is arranged to utilize the discrete output pulses produced by the stages of the binary counter whenever such stage changes from a zero state to a one state, then for each one bit of the binary number a pulse will be applied to the inhibit input means 18 to cause a pulse of the pulse train to be eliminated. By proper selection of the outputs of the various stages of the binary counter 39 output pulses may be produced at output means 38 of the binary correction circuit which are in direct relation to the arrangement of bits of the binary equivalent of the fractional portion of the calibration factor. Accordingly, pulses from the pulse source 10 will be eliminated in a manner which provides for a precisely calibrated output at output means 32 which may then be applied to any desired utilization means 90.

THe following more detailed description will illustrate the principle and method of operation of the correction referred to above.

For this purpose the number of pulses generated by pulse source 10 will be represented by $n$, and the number of units, say pounds, corresponding to a given number of pulses, $n$, is designated $N$. Then an acceptable circuit will guarantee that:

$Ny=n\pm a$ (1)

where $a \leq 1$

The incoming pulses are divided by the discrete part, $z$, of the calibration, $y$, in divider circuit means 14. The fractional portion of the calibration factor, $w$, is treated separately. When converted into a binary fraction, $w$ is expressed by:

$$w=C_12^{-1}+C_22^{-2}+C_32^{-3}+\ldots C_i2^{-i} \qquad (2)$$

$$=\sum_{i=1}^{i=\infty} C_i2^{-1}$$

where $C_i$ is either 1 or 0.

The binary fraction of the chosen example is:

$$w=0.78_{10}=\tfrac{1}{2}+\tfrac{1}{4}+\tfrac{1}{64}+\ldots$$

which, expressed as a fractional binary number, is:

$$w=0.110001_2 \quad (C_12^{-1} \quad C_22^{-2} \quad C_32^{-3} \ldots) \qquad (3)$$

In the above example $C_1$, $C_2$, and $C_6$ are equal to 1 and $C_3$, $C_4$ and $C_5$ are equal to 0.

Each term $C_i2^i$of the series for $w$ can be considered as a component of the error.

This component accumulates a whole pulse after $2^i$ pulses. In accordance with the invention, a correction is made every time that any of these components has accumulated one full pulse.

By multiplying equation (1) by $N$ we obtain:

$Ny=Nz+Nw$ (4)

If the reference unit pulses, $N$, are obtained in a circuit that takes into account only the value of $z$, the accumulated error is equal to $Nw$. For the chosen example, $Nw$ reaches a value larger than one full pulse, $n$, if $N$ is equal to 2. $Nw$ can be written from equation 4 as:

$$(2) \qquad Nw=NC_12^{-1}+NC_22^{-2}\ldots+NC_i2^{-1} \qquad (5)$$

$$=N\sum_{i=1}^{i=\infty} C_i2^{-1}$$

If $i=1$, a correction has to be made at every other units' pulse. The expression $i=1$ corresponds to the first factor of equation (5), which does exist if $C_1=1$. For the second factor of equation (5) a correction has to be made at every fourth units' pulse, etc.

In order to keep $Nw$ smaller than one sensor pulse, a correction must be made at any number of units' pulse for which the component $C_i2^{i1}$ has accumulated one-half of a sensor pulse. This can be readily demonstrated by examination of equation (5).

The $i$th stage of the binary correction counter 39 generates an output pulse after $2^{i1}$ pulses and every $2^i$ pulses thereafter. Thus a pulse is generated by the $i$th stage each time the $i$th error component ($c_i2^{i1}$) reaches the value one-half. Furthermore, no two stages of the counter change from zero to one simultaneously. Therefore, the two necessary conditions for maintaining the accumulated error at less than one are met if one sensor pulse is added to $z$ each time a stage in the counter, corresponding to $C_i=1$, changes from zero to one. These conditions are:

1. Accumulation due to $C_i2^{i1}$ is one-half.
2. One and only one pulse is added at a time to the discrete number $z$.

The pulsed outputs of selected states of the binary counter 39 are summed and fed to output means 38 of binary correction circuit 36.

If the organization of the binary correction circuit is provided such that a uniform pulse is used to index the binary counter 39 and if a pulse exists internally to each counter stage, then this internal pulse may be used. On the other hand, if the indexing pulse is not uniform the internal pulse cannot be so used and, since the regular output of the binary counter is only unique (second of the necessary requirements) as it changes from zero to one, a pulse forming network is required.

The properly provided unique output form output means 38 is coupled to inhibit input means 18 of blocking circuit 12 with the result that one incoming pulse, $n$, from pulse source 10 is blocked each time an output pulse, m, is produced by the binary correction circuit 36 of the feedback path 34.

The calibration of the foregoing specific example ($y=7.78$) requires presetting divider circuit 14 for division by seven. The output of divider circuit 14 drives the binary correction circuit 36 as shown in FIG. 1. Since the binary equivalent of the decimal fraction, 0.78, is 0.110001, the required correction is achieved by connecting unique output pulses, of the first, second and sixth stages of binary counter 39 with output means 38. These pulses are applied to inhibit input means 18 of blocking circuit 12 and pulses from pulse source 10 are eliminated in the desired manner. That is, a blocking pulse, $m$, should be generated by stages 1, 2 and 6 while stages 3, 4 and 5 do not generate such a pulse.

The principle of the correction system is illustrated further by the table of FIG. 5. In the table of FIG. 5 the calibration factor, y, is 0.78. The reference unit (pound, etc.) pulses, N, are shown in FIG. 5 in both decimal and binary form. Every stage for which $C_i$ is equal to 1 generates blocking pulses which are shown in FIG. 5 by an encircled 1. The stages not generating a blocking pulse are shown by a 1 without a circle.

The inherent error of the system of this invention is less than the value of one sensor pulse. The precision of the system, therefore, increases with an increase in the cumulative value of the measured characteristic, such as for example the metered flow. Thus, depending on the largest cumulative value of the flow to be metered, a small or a large number of stages are required for the binary counter 39. FOr large amounts of flow, the system of this invention becomes as accurate as the calibration can be made by assuming that the repeatability of the flow meter itself is very high, and superior to the accuracy achieved in the calibration.

As indicated hereinbefore, the method by which the calibration of the pulse train is made is based in logic so that the pulse train modification system of this invention may be employed with any desired hardware system, such as mechanical, fluid, electrical or the like. Moreover, as will become evident from the overall description of the invention, the system may use logic circuits of all the same basic type which contributes to the achievement of simplicity, reliability and lower cost.

Because the system is digital, the various logic circuits, bistable circuits and the like employed as components of the system should produce pulse outputs. For convenience in specification and the appended claims this characteristic has been variously referred to by designating such components as "pulse output-type" circuits or as circuits of the "pulse output type."

The foregoing described invention provides a precise calibration economically, in a pure digital manner and at low pulse rates. The system can be changed to provide for a different calibration factor simply and easily. Moreover, when desired the system can be made to continuously provide whatever calibration factor is required to maintain the desired precise calibration in spite of changes in the pulse train occasioned by changes in some parameter associated with the measured characteristic.

Although only certain specific embodiments of the invention have been described in detail herein with reference where suitable to the accompanying drawing, it is to be understood that the invention is not limited to those precise embodiments, and that various changes and modifications will occur to and may be made by those skilled in the art.

The appended claims, therefore, are intended to cover all such changes and modifications as fall within the true spirit and scope of the invention.

What we claim and desire to secure by Letters Patent of the United States is:

1. A pulse train modification system comprising:
   a. A pulse transmission path including a blocking circuit means positioned therein having a normal input means and an inhibit input means, said blocking circuit means being operative to receive said pulse train at said normal input means and prevent passage of a pulse whenever a pulse has been applied to said inhibit input means:
   b. Divider circuit means positioned in said pulse transmission path to receive pulses passed by said blocking circuit means and produce a divider output pulse in response to a preselected whole number of received pulses;
   c. Feedback means connected between the output means of said divider circuit means and the inhibit input means of said blocking circuit means and being operative to cause pulses to be applied to said inhibit input means to effect the blocking of pulses from said pulse train in a manner directly related to the arrangement of bits of the binary equivalent of the error between the divider output and a desired relationship of the pulses of said train; and
   d. Output means coupled with the output of said divider circuit means for extracting an output having the desired relationship.

2. A system for dividing pulse signals from a repetitive source by a factor which is made up of a whole number portion and a fractional portion, comprising:
   a. A pulse transmission path including a blocking circuit means positioned therein having a normal input means adapted to receive data pulse signals from the repetitive source and an inhibit input means, said blocking circuit means being operative to cause a received data pulse signal to be blocked every time a pulse is present at said inhibit input means;
   b. Divider circuit means positioned in said pulse transmission path to receive pulses passed by said blocking circuit means and producing an output pulse in response to a number of pulses corresponding to the whole number portion of said factor; and
   c. Feedback means connected between the output of said divider circuit and the inhibit input means of said blocking circuit means and being operative to cause pulses to be applied to said inhibit input means to effect the blocking of pulses from said pulse train in a manner directly related to the arrangement of bits of the binary equivalent of the fractional portion of said factor.

3. The system recited in claim 2 wherein said divider circuit means comprises a counter having a plurality of pulse output-type bistable stages and means operatively associated therewith for summing the outputs of selected stages to produce the desired whole number division.

4. The system recited in claim 3 wherein said means for summing the outputs of selected bistable stages comprises a plurality of switch means one associated with the output of each of said bistable stages.

5. The system recited in claim 2 wherein said feedback means comprises a binary correction counter means including a plurality of pulse output-type bistable stages and means operatively associated therewith for summing the outputs of selected stages to produce outputs from said binary correction counter which are directly related to the binary equivalent of the fractional portion of said factor.

6. The system recited in claim 5 wherein said means for summing the outputs of selected bistable stages comprises a plurality of switch means one associated with the output of each of said bistable stages.

7. The system recited in claim 6 wherein said switch means are responsive to signals indicative of a change in the pulse signals from said repetitive source to cause a change in said selection corresponding to any required change in the binary equivalent of the fractional portion of said factor:

8. The system recited in claim 7 wherein said divider circuit means comprises a counter having a plurality of pulse output-type bistable stages and means operatively associated therewith for summing the outputs of selected stages to produce the desired whole number division, said means for summing the outputs of selected stages comprising a plurality of switch means one associated with the output of each of said bistable stages and each switch means responsive to signals indicative of a change in the data pulse signals from said repetitive source to cause a change in said selection corresponding to any required change in the whole number division.

9. The method of modifying a pulse train to achieve a precise calibration with respect to a given reference unit and wherein the calibration factor required to achieve such precise calibration includes a whole number portion and a fractional portion, comprising the steps of:
   a. Dividing said pulse train by a factor corresponding to the whole number portion of the calibration factor;
   b. Generating from said divider output pulses a feedback pulse train which is directly related to the arrangement of bits of the binary equivalent of the fractional portion of the calibration factor; and
   c. Utilizing said feedback pulse train to cause pulses to be eliminated from the pulse train to be modified in accordance with the pulses of said feedback pulse train.

10. A digital measuring system comprising:

a. A digital sensor means operatively associated with a desired parameter to be measured and being operative to produce $n$ pulses for each reference unit of said parameter to be measured and wherein $n$ comprises a whole number portion and a fractional portion;

b. A blocking circuit means having a normal input means and an inhibit input means, said blocking circuit means being operative to pass pulses applied to said normal input means unless a pulse is also applied to said inhibit input means;

c. Means applying the pulses from said digital sensor means to the normal input means of said blocking circuit means;

d. Divider circuit means having its input means connected with the output means of said blocking circuit means and operative to receive pulses passed by said blocking circuit means and provide an output in response to a number of received pulses equal to the whole number portion of $n$;

e. Feedback circuit means connected between the output of said divider circuit means and the inhibit input means of said blocking circuit means, said feedback circuit means including a binary correction counter means connected to receive pulses from the output of said divider circuit means and being operative to produce pulses directly related to the arrangement of bits of the binary equivalent of the fractional portion of $n$;

f, Means applying the pulses produced by said binary correction counter means to said inhibit input means of said blocking circuit means to effect the blocking of pulses from said digital sensor means in a manner directly related to said pulses applied to said inhibit input means; and g. Utilization means coupled with the output of said divider circuit means.

11. The measuring system recited in claim 10 wherein said digital sensor means is operatively associated with a flowmeter.

12. THe measuring system recited in claim 10 wherein said binary correction counter means includes gating circuit means operatively associated therewith and which gating means are responsive to signals indicative of a change in the fractional portion of $n$ and are operative to effect a change in the output of said binary correction counter means corresponding to the binary equivalent of changes in the fractional portion of $n$.

13. The measuring system recited in claim 10 wherein said divider circuit means and said binary correction counter means each include gating circuit means which are responsive to signals indicative of a change in $n$ and are operative to effect changes in the output of said divider circuit means and the binary correction counter means so that said divider circuit produces an output corresponding to the changed whole number portion of $N$ n said binary correction counter means produces an output corresponding to the arrangement of bits of the binary equivalent of the fractional portion of $n$.